Patented Feb. 13, 1945

2,369,409

UNITED STATES PATENT OFFICE 2,369,409

RESIN PURIFICATION

John Ross, New York, N. Y., assignor to Colgate-Palmolive-Peet Company, Jersey City, N. J., a corporation of Delaware No Drawing. Application February 8, 1940, Serial No. 317,905

16 Claims. (Cl. 260—105)

This invention relates to the purification of natural resins and more particularly to purifications of rosin and related acidic resinous materials.

In the past, a great number of processes have been described on methods of purifying natural resins, particularly low-graded wood rosin. The more recent developments have been directed to a major extent to the use of solvents for the purification of these various resinous materials but, although these methods are successful to a degree in preparing light colored materials, their commercial development is seriously hampered because the cost involved is relatively high. The physical properties of the resins are so similar to those of the detrimental, malodorous and discolored associated substances that it is not possible to separate these two types of materials by direct distillation or like physical methods.

It has now been discovered that rosin and similar materials can be purified by an efficient economical process to remove malodorous, undesirable and other naturally associated materials not separable therefrom by prior art methods. The resinous products of the present invention are harder and have an apparently higher melting point than the original resinous materials.

In accordance with the present invention, rosin in the form of its soap, with or without pretreatment, is subjected, after or during saponification, in conjunction with a flux or liquid salt that is liquid at the temperature desired, such as a fatty acid soap, to a properly regulated heat treatment, at relatively high temperatures, while passing a strong current of steam or other inert gas through it, advantageously under reduced pressure, in the substantial absence of air and liquid water.

The addition of the flux, that is, a fatty acid material, or the soap thereof, is an essential feature of the present invention. The treatment of rosin alone by this method will not operate because it is not possible to fuse an anhydrous soap thereof. It has now been found that, when a rosin soap is admixed with a fatty acid soap, it is possible to fuse the homogeneous, anhydrous mass and thus permit the passage of inert gas therethrough and to volatilize the higher boiling non-saponified ingredients thereof.

The above treatment removes the unsaponifiable material from the saponified mass, and apparently at certain temperatures changes the characteristics of both the saponified resin and the fatty acids, as well as the unsaponified material, with marked improvement in them. The treatment may be carried out at various temperatures, preferably ranging from about 200° C. to about 350° C. In this temperature range, the substantially anhydrous mixed rosin-fatty acid soap is in a freely fluid form, so that the gas which is passed through it thoroughly agitates it, insuring uniformity of temperature throughout the mass and preventing any portions of the mass, for example, those portions in contact wtih the walls of the vessel, from being overheated and subjected to decomposition. The strong current of steam or other inert gas which is used serves not only to agitate the liquid mass, but also to assist materially in the vaporization of the unsaponifiable materials which are distilled off and to blanket the mass and exclude air, thus preventing oxidation at the high temperatures used. The unsaponifiable material is vaporized from the saponified mass and is condensed in a suitable condenser substantially free from the steam.

This treatment appears to alter the character of the saponified product. The product obtained is free from objectionable odor and is substantially free from unsaponifiable material; it forms a harder soap when grained; and the acids which may be liberated from it possess a greater stability.

The resin used may be any natural acidic resin but the process is particularly adapted to rosin purification. The resin may be gum rosin of any grade, wood rosin of any grade, ester gum, limed rosin, shellac, mastic, elemi and/or certain copals. The process is especially suitable for recovering the rosin and turpentine from the crude oleo-resin exudation of the pine and other coniferae. A purer resin is obtained, of lighter color and better odor. The yield of turpentine, pine oil and other resin spirits is also appreciably increased. The oleo-resinous material extracted from stumps in the preparation of wood rosin may be similarly employed. If the resin and fatty acid treated is a previously distilled, bleached, and/or otherwise purified product, the saponified product obtained by the process of this invention is light in color, as the process causes little or no darkening if carried out under proper conditions.

That the process can be successfully applied to solid, hard resins, such as rosin, or their saponified products, is unexpected, because ordinary rosin, when treated in the same manner, does not liquefy but usually decomposes due to local overheating.

The resin-fatty acid soap mixture after the high temperature steam treatment is a completely saponified product free from the unsaponifiable constituents normally associated therewith. It may be used directly as a soap or it may be separated into its individual constituents by splitting the soaps into the corresponding acids and then separating the fatty acid from the rosin. This is preferably accomplished by fractional distillation. It may also be accomplished by esterification of the fatty acids and removal of the fatty acid esters from the resin acids, for example by fractional distillation or by washing an ether or gasoline solution of the mixture with a dilute aqueous alkali solution to remove the resin acid therefrom. It may also be accomplished by fractional crystallization from a solution of the acid mixture or the partially esterified mixture. Any of these separation means alone, or in various combinations, may be employed.

The hot anhydrous soap from the high temperature steam treatment may be cooled by various methods. For example, it may be introduced under the surface of water or of a hydrated soap in order to dissolve it more readily. It may be cooled in a suitable pulverizing device, in a spray tower, or on a cooling roll, with or without water, steam and/or inert gas.

An additional feature of the present invention is to treat the resin in the form of a soap or mixed resin-fatty acid soap, thinned with water, with a caustic alkaline salt brine. Blowing may advantageously be combined with the graining operation by treating the resin soap or mixed resin-fatty acid soaps with an alkaline sodium chloride brine, meanwhile stirring well with a current of steam and/or other inert gases. The soap is salted out of the mixture, by this treatment whereas the sodium phenates, lignin, glycerine and like materials pass into the brine solution. In order to insure more complete separation, the hot mixture is permitted to stand. The brine solution is removed from the soap, which may then be thinned with water and again salted out of solution. The procedure may be repeated to obtain more thorough removal of the phenolic, lignin and like bodies. The steam will volatilize many of the odoriferous lower-boiling non-saponifiable materials which may be collected in a suitable condenser. The steam also serves to agitate the solution, thus aiding in the washing with the brine, as well as to heat the solutions, thereby increasing the solubility of the impurities in the brine. The brine wash step may be conducted on the soaps at any point in the process.

Although it is not essential, it is also possible to dissolve the resin or resin-fatty acid mixture in gasoline in order to separate the gasoline-insoluble matter. The latter may be removed by decantation, centrifugation and/or filtration with or without the aid of silica gel, activated carbon and/or filter clay. Sufficient gasoline should be used to overcome the solubilizing effect of the resin and/or fatty acids and to render the impurities insoluble, usually three parts solvent to one of acids under treatment. The gasoline solution may then be further treated with furfural, liquid sulphur dioxide, amphoteric metal halides such as stannic chloride, and/or with similar materials to remove certain viscous, resinous and/or color bodies. If desired, the resin or resin-fatty acids may be distilled, bleached with chlorine or hypochlorite, and/or hydrogenated at an appropriate time during the treatment in order to improve the final products.

When a crude, dark product is treated, it may be desirable, after the high temperature steam treatment of the anhydrous soaps, to split the soap and distill the resin acid as well as the fatty acids to improve their color. When light-colored raw materials are used, such distillation of the resin and fatty acids, after treatment, is not necessary but is usually desirable to separate these two types of materials. The separated fatty acids can be used for preparing high grade soap or even edible products. The resin acids can be used in resin, adhesive and coating compositions as well as for soaps alone or in admixture with the fatty acid. The unsaponifiable organic bodies obtained as a condensate from the high temperature steam treatment can be used as plasticizers or solvents, or in preparing various synthetic chemical compositions. For example, they may be used as wetting agents and detergents in the form of the salts of their sulphuric and phosphoric acid derivatives, or they may be hydrogenated to form perfumes, fixatives, plasticizers, solvents and the like. The unsaponified material may be again treated by the present process to effect complete separation of saponifiable constituents.

The separation of the rosin-fatty acid soap mixture after the high-temperature steam treatment to recover the fatty acids and the resin acids in individual fractions is preferably accomplished by fractional distillation. The absence of non-saponifiables renders the separation of the fatty acids from the rosin acids by fractional distillation more efficient than when such materials are present.

The fractional distillation may be conducted by taking the soap product from the high temperature steam treatment, acidifying to obtain the organic acids, and washing the acids free from water-soluble extraneous matter. The dried washed acids are then ready for fractionation which is advantageously carried out by first rapidly heating the material in a pipe still. The temperature of the heater is preferably controlled so as to raise the temperature of the acids as they pass therethrough to substantially 250° to 300° C. as rapidly as possible within several minutes. The temperatures and pressures are dependent, to a large extent, upon the nature of the fatty acids and of the particular rosin being treated. Steam, preferably superheated, may be added to the acids during the heating process in order to assist in the subsequent vaporization.

The acid vapors issuing from the heater pass into a flash chamber preferably at a reduced pressure of about 5-10 mm. In this apparatus the unvolatilized portion, mainly tarry material, is separated from the volatilized portion and drops to the bottom of the flash chamber. Steam superheated to the heater outlet temperature is passed into the bottom of the flash chamber for stripping purposes. If desired, a number of plates may be included below the heater vapor outlet so as to strip more effectively the bottoms of valuable resinous materials. The tarry materials may be withdrawn from the bottom of the flash chamber. Baffles are placed at the top of the flash chamber to remove entrained unvaporized materials from the desired organic acid vapors.

A number of fractionating systems are possible, but a series of individual fractionating columns is preferred to the use of only one tower containing many bubble plates.

In the preferred procedure the vapors issuing from the flash chamber are passed into a bubble-plate column supplied with superheated bottom-stripping steam. In this column resin acid bottoms are removed and an overhead cut is taken. Reflux is supplied by means of a partial condenser located at the top of the column. The cooling medium for this condenser may be charging stock already raised in temperature by passage through the partial condensers connected to the succeeding columns that are operated at successively lower temperatures. In this manner the over-all thermal efficiency may be greatly increased. The stripped bottoms discharged from this column are valuable resin acids and are substantially free from the mixture of fatty acids comprising the overhead from this column. These resin acids may be fractionated again by the same or by other suitable methods. In the succeeding columns the now resin-free mixture of fatty acids is separated. By proper control of the individual reflux ratios and bottom steam ratios, taking also into consideration the effectiveness of the columns, it is possible to cut the mixture of fatty acids and resin acids into very narrow-boiling fractions.

An alternate procedure is to separate the mixture by passing the vapors issuing from the flash chamber into a bubble-plate fractionating tower. The fatty acid and resin acid vapors, entering the fractionating tower which maintains a suitable reflux, may be separated by reason of their different boiling points into relatively pure fractions of resin acids and fatty acids. The hot liquid acids may be drawn from various plates in the tower which contain the largest percentage of individual acids, and passed into individual reboilers. Steam, superheated to the proper temperature, is passed into the bottom of the reboiler where the feed is stripped of the more volatile portions, which vapors are returned to the column. For a more complete separation, the liquid withdrawn from the stripper may be further fractionated. The liquid drawn from the bottom of this fractionating column consists primarily of relatively pure resin acids. In order to facilitate fractionation, a current of steam is passed into the column from an open steam coil positioned in the bottom of the fractionating column.

From the upper bubble-plate of the single or the last fractionating column the vapors, consisting principally of steam and a fatty acid, pass through a reflux condenser which furnishes sufficient reflux for the desired fractionation. The non-condensed vapors pass through a line into a vapor condenser wherein the temperature is so regulated that practically all of the remaining fatty acid vapors are liquefied and the steam is left in the vapor state. The fatty acid liquefied in the condenser is substantially pure. Any fatty acids suspended in the steam are removed by passing the steam around suitable baffles whereby the particles of fatty acid are removed. The steam, freed from its suspended fatty acids, is preferably passed directly to a barometric condenser to which are connected suitable vacuum pumps or steam jets which serve to maintain the entire system under a suitable reduced pressure. In either procedure, portions of certain of the fatty acid fractions may be returned to the feed to raise the vapor pressure of the original mixture. It should also be noted that, although it is preferred to flash into the flash chamber, in some instances it may be desirable to flash the acids directly into the fractionating tower. The process may be conducted in a continuous manner or it may be carried out in a batch procedure.

Although this description is directed to the fractional distillation of the mixed acids, it is also possible, in order to effect separation of the resin acids from the fatty acids, to esterify the fatty acids in the presence of inorganic acids, such as sulphuric acid or hydrochloric acid, with one or more alcohols, such as methyl alcohol, ethyl alcohol, and butyl alcohol. The esters of the fatty acids differ appreciably in physical properties from the rosin acids and hence may be more readily separated therefrom than the original fatty acids.

The separation of the rosin from fatty acids or esters thereof by distillation may be effected with or without additional materials such as aliphatic, alicyclic, terpene and aromatic hydrocarbons, fatty acids, and the like. Solvent extraction and like methods also may be employed. Another method involves the solution of a mixture of fatty acid esters and rosin acids in a solvent, such as ether or gasoline, and the extraction of the rosin acids therefrom with an aqueous alkaline solution.

The invention will be further illustrated by the following specific examples, although it is not limited thereto.

*Example I*

One hundred (100) parts by weight of tallow fatty acids are introduced into a suitable closed vessel having an agitator, a steam inlet, a thermometer and an outlet to a condenser. These fatty acids are heated by external heat, meanwhile slowly adding 21 parts by weight of soda ash. The addition of soda ash and the rate of heating are adjusted so that the temperature is above 200° C. and the mixture molten when all the soda ash has been added. A vigorous current of steam is passed through the material under treatment as soon as the mixture is heated above the boiling point of water. This serves to agitate the mixture, to remove unsaponifiables, and to exclude air from the vessel. When the anhydrous fatty acid soap mixture has reached a temperature of 250° C., 100 parts by weight of powdered M gum rosin are added. 18 parts by weight of soda ash are slowly added, meanwhile maintaining the temperature at about 250° C. or higher. The temperature is then raised to about 300° C. and held there for about one hour. The current of steam is continued throughout the entire treatment. Odoriferous, unsaponified material is separated from the steam by condensation. The soaps are rapidly cooled on rolls and then split into the corresponding acids. The fatty acids are esterified with ethyl alcohol in the presence of a sulphuric acid catalyst and are then separated from the free resin acids by fractional distillation to obtain relatively pure resin acids and fatty acid ester fractions. The fatty acid esters may be hydrolyzed to yield light-colored fatty acids having a pleasant odor.

*Example II*

One thousand (1,000) parts by weight of coconut oil and 1,000 parts of powdered M gum rosin are heated in an apparatus similar to that described in Example I to a temperature of about 250° C., meanwhile adding about 440 parts by weight of soda ash and continuously passing a current of steam through the mixture. The treatment is continued for about one hour until all glycerine and unsaponifiables have been removed. After all the material is added, the temperature is raised to about 300° C. at which point it is held for about one hour. The volatile unsaponified material is condensed from the steam and dried with anhydrous sodium sulphate. The mixed soaps are cooled in an inert atmosphere. The mixed soaps show better washing and foaming properties than the mixed material not so treated. The soaps may be split to the acids, and the acids fractionally distilled to obtain relatively pure fractions of resin and fatty acids. At this temperature of treatment the iodine number of the rosin has not been changed. The unsaponified material is boiled with 5% caustic potash solution. The mixture is then extracted with petroleum ether. The petroleum ether is evaporated to yield 47 parts by weight of unsaponifiable material having the following distillation range at 5 mm. pressure:

| Temperature | Percent distilled |
|---|---|
| Below 185° C | 3 |
| 185°–195° C | 30 |
| 195°–205° C | 27 |
| 205°–225° C | 27 |
| Above 225° C | 12 |

The high temperature treatment of the anhydrous soap may be operated so that the rosin may be added with fatty acid soap and alkali, or the two soaps may be added together individually, or the rosin and fatty acid may be added with alkali. It is important that the fatty acid soap or fatty acid and alkali be present when it is attempted to liquefy the rosin soap. When starting with a hydrated soap mixture, care must be taken during the initial stages of the heating to prevent local overheating and decomposition at the surfaces of contact between the vessel and the product. One way to carry out the treatment starting with the aqueous saponified material is to maintain a body of some of the anhydrous soap at the relatively high temperature of about 250° to 350° C., at which it is thinly fluid, and to add the rest of the material at a rate not substantially greater than the rate at which it may be heated to the temperature necessary for fluidity, and to operate the process with continuous or successive additions of crude material and withdrawals of treated material. An advantageous method is to heat the soap solution under pressure and to flash it into the treating vessel, alone or by means of superheated steam, thereby introducing the mixed soap in a substantially anhydrous fused condition.

When the lower temperatures, in the neighborhood of 200° to 250° C., are used for the alkali-steam treatment, a longer time of treatment is generally required to provide the substantially complete separation of the unsaponifiable constituents. The time required for this separation will vary with the temperature of the treatment, the pressure maintained within the vessel, and the amount of steam used. It will also vary somewhat with the particular rosin and fluxing acids treated, as some rosins or fluxing acid materials contain more unsaponifiable material, or less-volatile unsaponifiable material, than other raw materials. In general, the rapidity of separation of unsaponifiable material is greater at higher temperatures, at higher vacua, and with injection of greater quantities of steam. Another factor which influences the selection of proper periods and temperatures for treatment is that the desirable changes in the characteristics of the various products, for example, the lowering of the acetyl values and iodine values of the acids and of the unsaponifiable material, are more rapid and greater at higher temperatures, for example 300° to 325° C., than at lower temperatures, for example 225° to 250° C. In general, temperatures of 250° to 300° C. are preferred. In some cases, temperatures in excess of 350° C. may be used, but it is advantageous to avoid the use of such high temperatures because of the danger of decomposition.

Various alkaline materials may be used for the saponification, including caustic alkalies, caustic soda, potash, lime, carbonated alkalies, soda ash, potassium carbonate, limestone, marble dust, magnesium carbonate, dolomite, etc., or mixtures thereof. Soda ash is preferred because it is cheap and effective and produces a directly usable sodium soap. It may be necessary to change the temperatures used if alkaline materials other than caustic soda or soda ash are used, because of the differences in the melting points of the soaps formed with metals other than sodium. In any event, the temperature must be sufficiently high to insure the necessary fluidity.

It is possible to add the organic fluxing acid materials in various forms to the rosin at any point during the process. For example, various oils, fats and waxes may be added to the crude resin before any processing has been effected to remove various impurities which they contain. Suitable addition agents are wool fat, certain grades of garbage grease, whale oil, shark, menhaden and other fish oils, spermaceti, tallow, coconut oil, olive oil, tall oil, cottonseed oil, cottonseed foots, castor oil, linseed oil, China-wood oil, oiticica oil, soya bean oil, palm oil, montan wax, carnauba wax, Japan wax, Chinese wax, oxidized and petroleum, as well as the various individual acids thereof, such as caproic, lauric, stearic, palmitic, oleic, myristic, naphthenic, or behenic acids, or their halogenated derivatives, or mixtures of any of these fats, oils, waxes, resins and acids. The addition agent should be selected so that the salt thereof melts in the desired range and does not decompose. The preferred acid would be one which also has a low boiling point, such as lauric acid, capric acid, myristic acid, or coconut oil acids, so that the mixed acids obtained by acidulation of the mixed soaps may be readily fractionated by distillation to recover the individual fatty acids and resin acids. When employing fatty oils or waxes as the fluxing agent, fatty alcohols and/or glycerine may be fractionally condensed from the unsaponifiable material, or they may be recovered by other methods.

The resin product with or without the accompanying fluxing acids may be reacted with various materials, including mono- and polyhydric alcohols, mono- and polyamines and the like, with or without other materials such as mono- and polybasic acids. For example, the mixed acid product obtained by treatment of rosin with unsaturated acid compounds, such as linseed oil, China-wood oil and the like, may be reacted with glycerine to form varnishes, or with glycerine and phthalic acid and/or maleic acid to form alkyd resins. The various new rosin compositions may also be used in combination with any of the common auxiliary agents. Suitable addition agents are film-forming ingredients, including alkyd resins, phenol aldehyde resins, vinyl resins, methacrylate resins, gums, waxes, glue, nitrocellulose, cellulose acetate, methyl cellulose and ethyl cellulose; coloring matter, such as dyes, lakes, and pigments; abrasives and fillers, such as silica, pumice, feldspar, precipitated chalk, infusorial earth, bentonite, and talc; emulsifying agents, including long-chain alcohol sulphate salts, monoglyceride monosulphate salts, salts of sulphonated mineral oil extracts, Turkey red oil, lecithin, and ethanolamine soaps; solvents and diluents, including carbon tetrachloride, perchlorethylene, trichlorethylene, glycerine, water, ethyl alcohol, glycol, tetrahydrofurfuryl alcohol, phenol, cyclohexanol, water, tetralin, decalin, pine oil, mineral oil, mineral oil extracts, and naphtha; perfumes and deodorants; germicides, such as phenol and organic or inorganic mercury compounds; any of the common water-soluble alkali metal or ammonium salts; and various mixtures thereof. The type of addition agent to be used will depend, of course, on the ultimate use of the new purified rosin composition. The various ingredients may be mixed by any of the common methods, such as milling, stirring, kneading, crutching, fusing, and drying of mixed solutions or dispersions.

As many widely different embodiments of the invention may be made without departing from the spirit and scope thereof, it is to be understood that the application is not limited to the specific proportions or embodiments thereof except as defined in the following claims.

I claim:

1. The process of recovering high-boiling unsaponifiable material from rosin and of purifying rosin which comprises passing an inert gas through a mixture of saponified rosin and a metal fatty acid soap having a melting point in the anhydrous state lower than about 350° C. at temperatures above the melting point but below the decomposition point of the mixture throughout the treatment and in the substantial absence of air and liquid water, continuously vaporizing and withdrawing unsaponifiable material during said treatment, condensing the vaporized unsaponifiable material, acidifying the unsaponifiable-free soap mixture to liberate the organic acids, and fractionating the acids to obtain pure rosin and other carboxylic acid fractions.

2. The process of purifying acidic natural resins which comprises heating, in an inert atmosphere and in the substantial absence of liquid water, an acidic natural resin and a higher monocarboxylic acid material of the class consisting of acids capable of yielding an anhydrous salt of lower melting point than 350° C. and of esters and metal salts of said acids, with sufficient saponifying reagent to saponify the mixture substantially completely, to a temperature not lower than the melting point but below the decomposition point of the reaction mixture throughout the treatment while blowing the resulting molten anhydrous salts with an inert gas to remove high-boiling unsaponifiable material therefrom, and removing the unsaponifiable material during the treatment.

3. The process of purifying acidic natural resins which comprises heating, in an inert atmosphere and in the substantial absence of liquid water, an acidic natural resin and a carboxylic acid metal salt having a melting point in the anhydrous state lower than the decomposition point of the associated salt of the natural resin with sufficient saponifying reagent to saponify the mixture substantially completely, to a temperature not lower than the melting point but below the decomposition point of the reaction mixture throughout the treatment while blowing the resulting molten anhydrous salts with an inert gas to remove unsaponifiable materials therefrom, and removing unsaponifiable materials during the treatment.

4. The process which comprises heating, in the substantial absence of air and liquid water, a mixture of a salt of a natural resin acid and a substantially fully saponified carboxylic acid metal salt having a melting point in the anhydrous state lower than about 350° C. to a temperature below about 350° C. but not lower than the melting point of the substantially anhydrous salt mixture, while passing a stream of steam therethrough, and distilling off unsaponifiable material during the treatment.

5. The process which comprises heating, in an inert atmosphere and in the substantial absence of liquid water, a mixture of a salt of a natural resin acid and a substantially fully saponified carboxylic acid metal salt having a melting point in the anhydrous state lower than about 350° C. to a temperature below about 350° C. but not lower than the melting point of the substantially anhydrous salt mixture, while passing a stream of inert gas therethrough, and removing unsaponifiable material during the treatment.

6. The process which comprises heating, in the substantial absence of air and liquid water, a mixture of a salt of a natural resin acid and a substantially fully saponified carboxylic acid metal salt having a melting point in the anhydrous state lower than about 350° C. to a temperature below about 350° C. but not lower than the melting point of the substantially anhydrous salt mixture, while passing a stream of inert gas therethrough in order to remove volatile non-saponifiable materials therefrom, removing the non-saponifiable materials during the treatment, acidifying the remaining salt mixture to free the acids thereof, and fractionating the acids to relatively pure resin and other pure carboxylic acid fractions.

7. The process of purifying rosin which comprises heating, in an inert atmosphere and in the substantial absence of liquid water, rosin and a higher monocarboxylic acid material of the class consisting of acids capable of yielding an anhydrous salt of lower melting point than 350° C. and of esters and metal salts of said acids, with sufficient saponifying reagent to saponify the mixture substantially completely, to a temperature not lower than the melting point but below the decomposition point of the reaction mixture throughout the treatment while blowing the resulting molten anhydrous salts with an inert gas to remove unsaponifiable materials therefrom, and removing the unsaponifiable materials during the treatment.

8. The process of purifying oleo-resinous exudations which comprises heating an oleo-resinous exudation and a higher monocarboxylic acid material of the class consisting of acids capable of yielding an anhydrous salt of lower melting point than 350° C., and of esters and metal salts of said acids, with sufficient saponifying reagent to saponify the mixture substantially completely, in an inert atmosphere and in the substantial absence of liquid water, to a temperature not lower than the melting point but below the decomposition point of the reaction mixture throughout the treatment while blowing the resulting molten anhydrous salts with an inert gas to remove unsaponifiable materials therefrom, and removing the unsaponifiable materials during the treatment.

9. The process of purifying rosin which comprises heating, in an inert atmosphere and in the substantial absence of liquid water, rosin and a carboxylic acid metal salt having a melting point in the anhydrous state lower than the decomposition point of the associated rosin salt with sufficient saponifying reagent to saponify the mixture substantially completely, to a temperature not lower than the melting point but below the decomposition point of the reaction mixture throughout the treatment while blowing the resulting molten anhydrous salts with an inert gas to remove unsaponifiable materials therefrom, and removing the unsaponifiable materials during the treatment.

10. The process of purifying rosin which comprises heating, in an inert atmosphere and in the substantial absence of liquid water, rosin and a higher monocarboxylic acid material of the class consisting of acids capable of yielding an anhydrous salt of lower melting point than 350° C. and of esters and metal salts of said acids, with sufficient saponifying reagent to saponify the mixture substantially completely, to a temperature not lower than the melting point but below the decomposition point of the reaction mixture throughout the treatment while blowing the resulting molten anhydrous salts with steam to remove unsaponifiable materials therefrom, and distilling off the unsaponifiable materials during the treatment.

11. The process which comprises heating, in the substantial absence of air and liquid water, a mixture of a salt of rosin and a substantially fully saponified carboxylic acid metal salt having a melting point in the anhydrous state lower than about 350° C. to a temperature below about 350° C. but not lower than the melting point of the substantially anhydrous salt mixture, while passing a stream of steam therethrough, and continuously distilling off unsaponifiable material during the treatment.

12. The process which comprises heating, in an inert atmosphere and in the substantial absence of liquid water, a mixture of a salt of rosin and a substantially fully saponified carboxylic acid metal salt having a melting point in the anhydrous state lower than about 350° C. to a temperature below about 350° C. but not lower than the melting point of the substantially anhydrous salt mixture, while passing a stream of inert gas therethrough, and distilling off unsaponifiable material during the treatment.

13. The process which comprises heating, in the substantial absence of air and liquid water, a mixture of a salt of a rosin and a substantially fully saponified carboxylic acid metal salt having a melting point in the anhydrous state lower than about 350° C. to a temperature below about 350° C. but not lower than the melting point of the substantially anhydrous salt mixture, while passing a stream of inert gas therethrough in order to remove volatile non-saponifiable materials therefrom, distilling off the non-saponifiable materials during the treatment, acidifying the remaining salt mixture to free the acids thereof, and fractionating the acids to relatively pure rosin and other pure carboxylic acid fractions.

14. A process of recovering wood rosin from oleo-resinous extracts of pine which comprises reacting, in an inert atmosphere and in the substantial absence of liquid water, an oleo-resinous extract and a higher monocarboxylic acid material of the class consisting of acids capable of yielding an anhydrous salt of lower melting point than 350° C. and of esters and metal salts of said acids, with sufficient alkaline material to saponify the mixture substantially completely, at a temperature not lower than the melting point but below the decomposition point of the reaction mixture throughout the treatment while blowing the resulting molten anhydrous salts with an inert gas to remove high-boiling unsaponifiable material therefrom, and distilling off the unsaponifiable material during the treatment.

15. The process of purifying rosin which comprises reacting, in an inert atmosphere and in the substantial absence of liquid water, rosin and a higher monocarboxylic acid material of the class consisting of acids capable of yielding an anhydrous salt of lower melting point than 350° C. and of esters and metal salts of said acids with sufficient alkali metal carbonate to saponify the mixture substantially completely, at a temperature not lower than the melting point but below the decomposition point of the reaction mixture throughout the treatment while blowing the resulting molten anhydrous salts with an inert gas to remove high-boiling unsaponifiable material therefrom, and continuously distilling off the unsaponifiable material during the treatment.

16. The process of fractionating natural oleo-resinous material which comprises reacting, in an inert atmosphere and in the substantial absence of liquid water, an oleo-resinous material and a higher carboxylic acid material of the class consisting of acids capable of yielding an anhydrous salt of lower melting point than 350° C. and of esters and metal salts of said acids, with sufficient saponifying reagent to saponify the mixture substantially completely, at a temperature not lower than the melting point but below the decomposition point of the reaction mixture throughout the treatment while blowing the resulting molten anhydrous salts with an inert gas to agitate the mass and to remove turpentine and other unsaponifiable material therefrom, and continuously vaporizing and withdrawing turpentine and other unsaponifiable material during the treatment.

JOHN ROSS.